Nov. 30, 1926.
R. D. KING ET AL
1,608,942
MACHINE FOR COATING CONFECTIONS WITH NUTS
Filed May 25, 1925    11 Sheets-Sheet 1
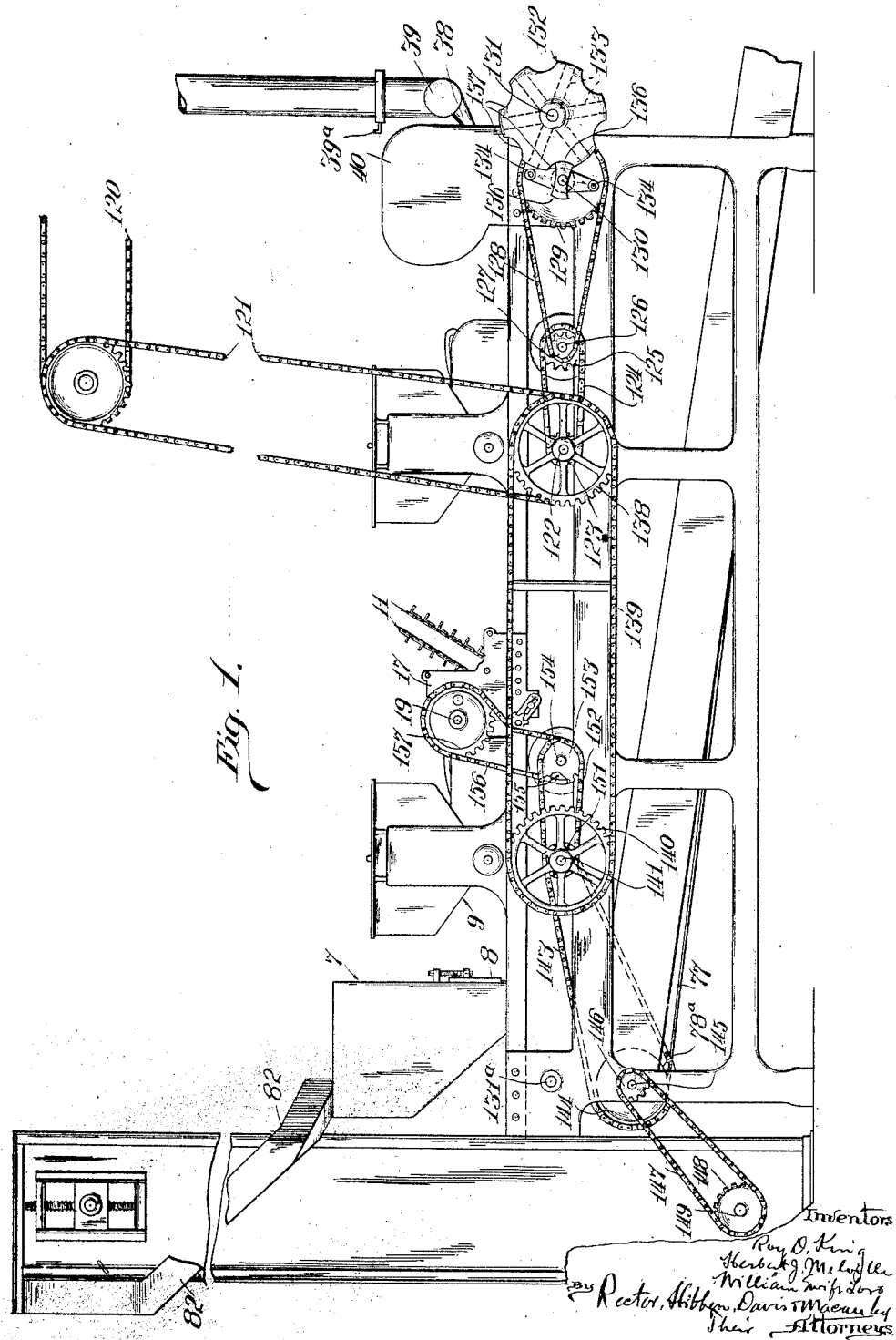

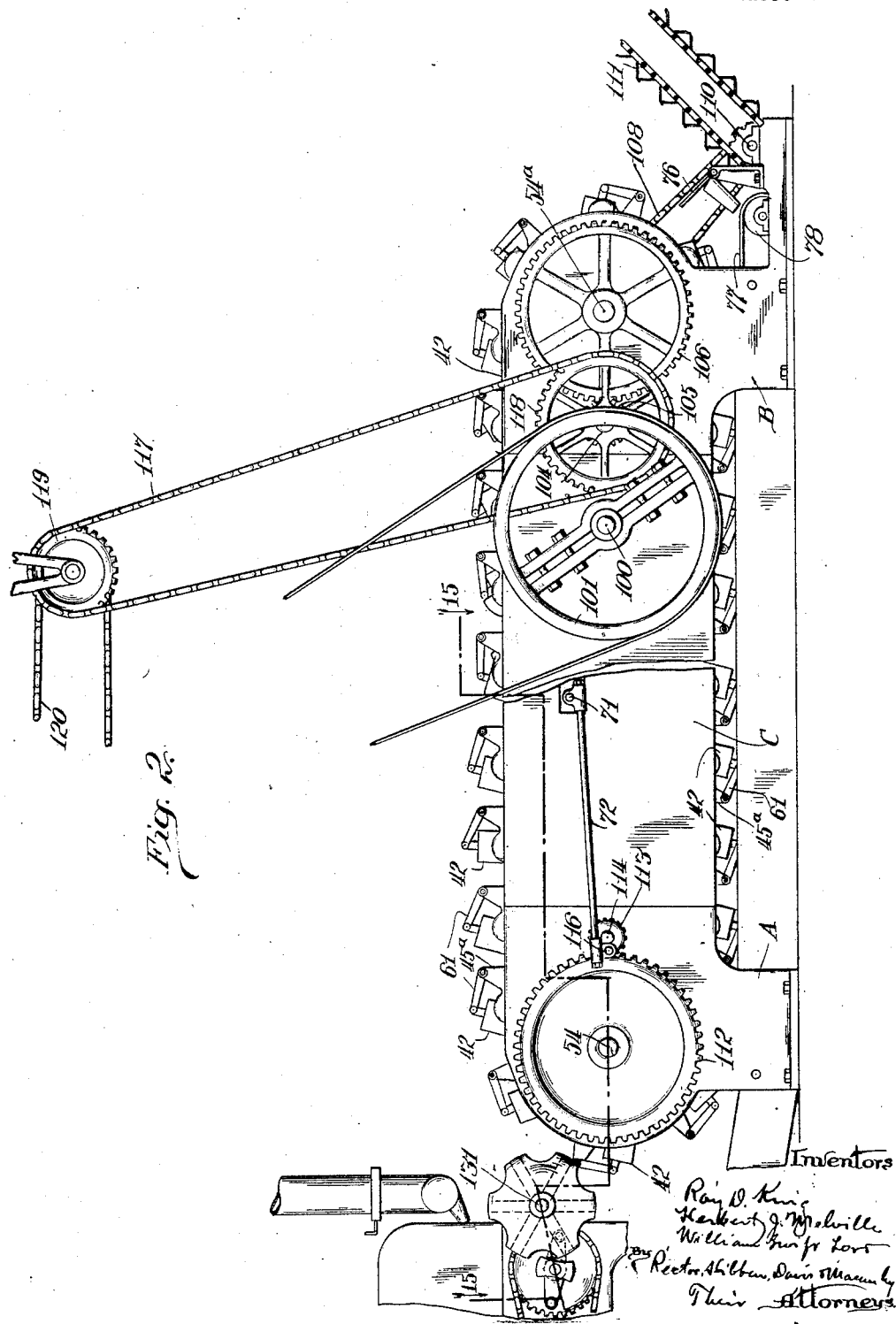

Nov. 30, 1926.
R. D. KING ET AL
1,608,942
MACHINE FOR COATING CONFECTIONS WITH NUTS
Filed May 25, 1925 11 Sheets-Sheet 3
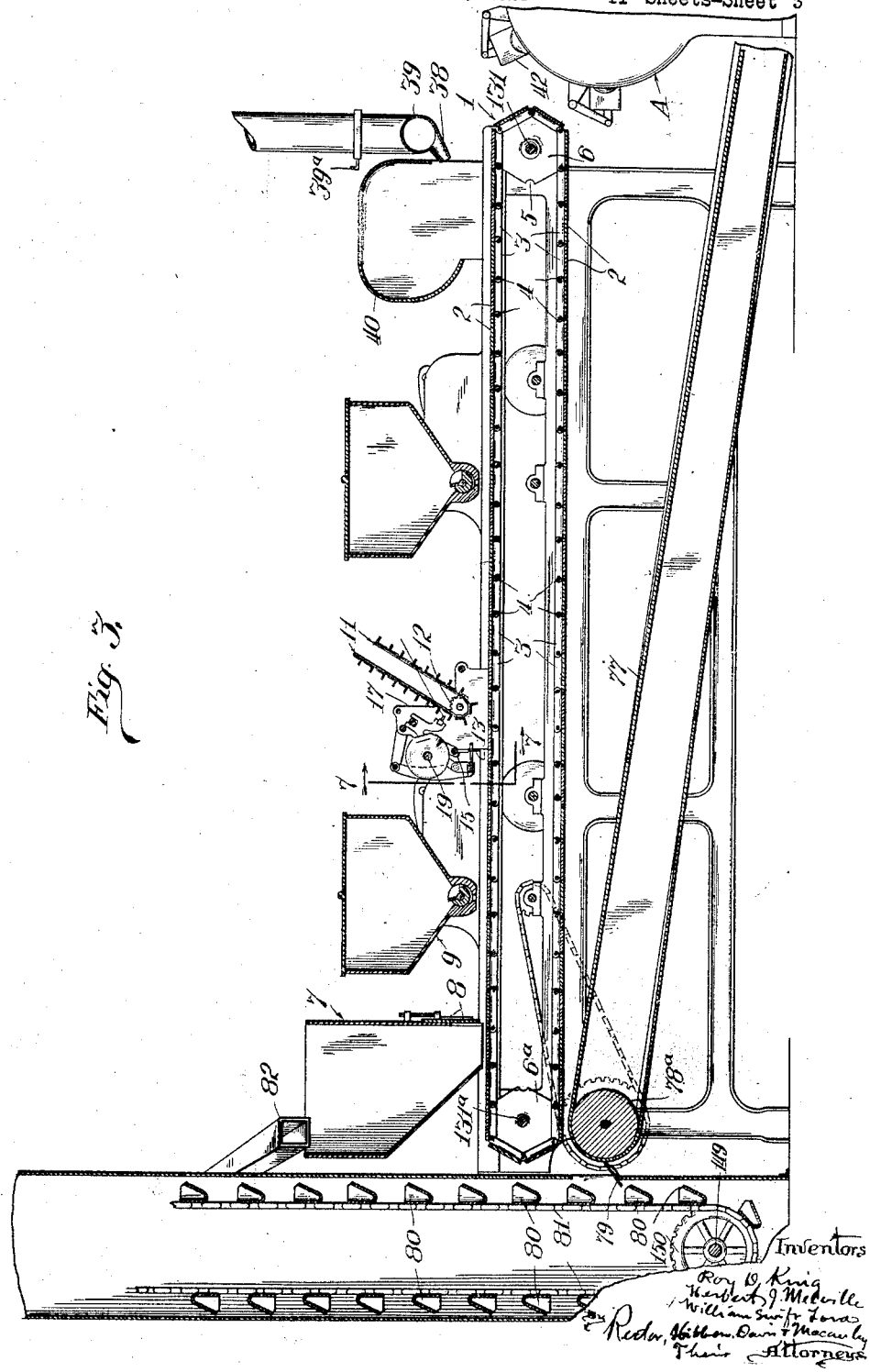

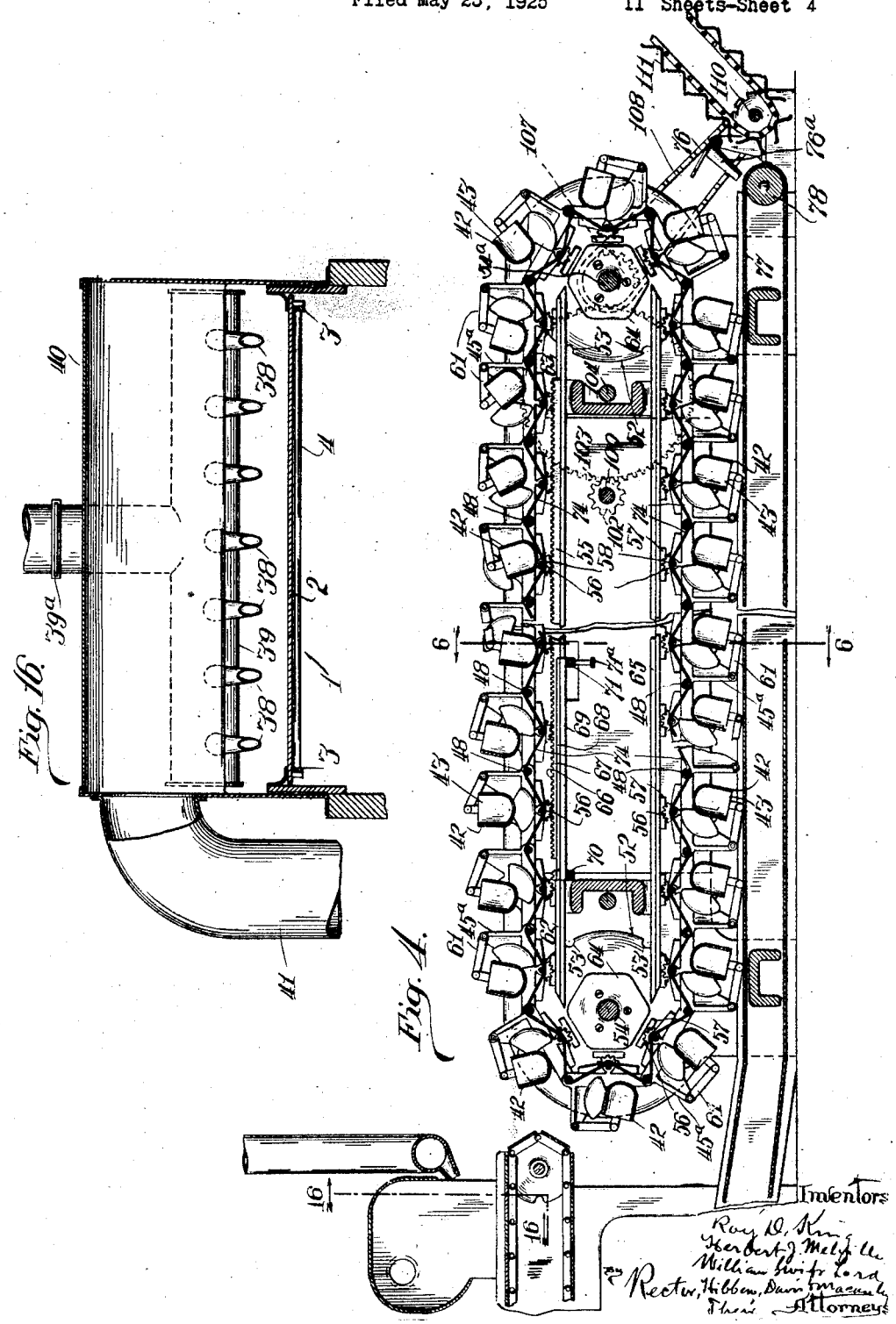

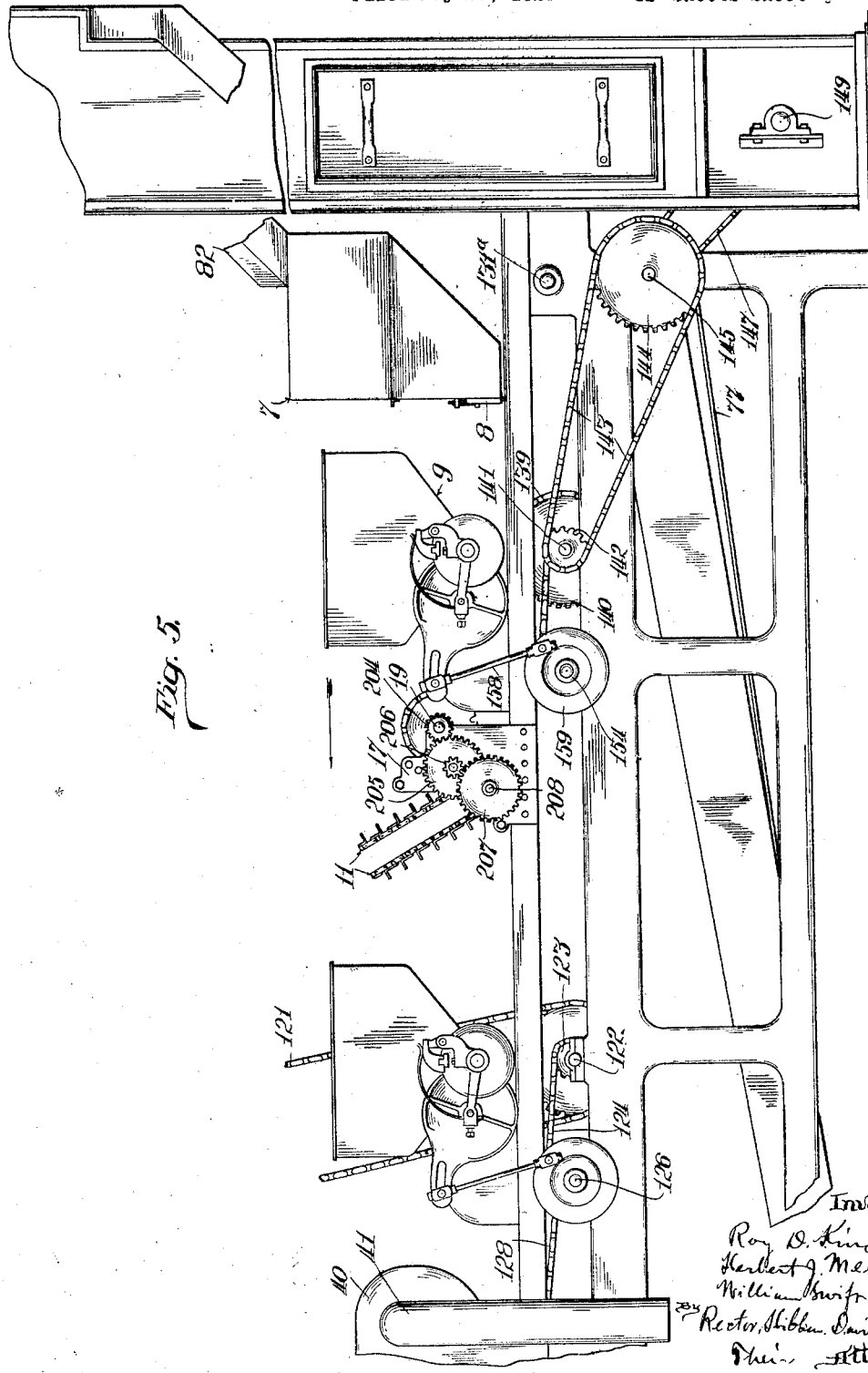

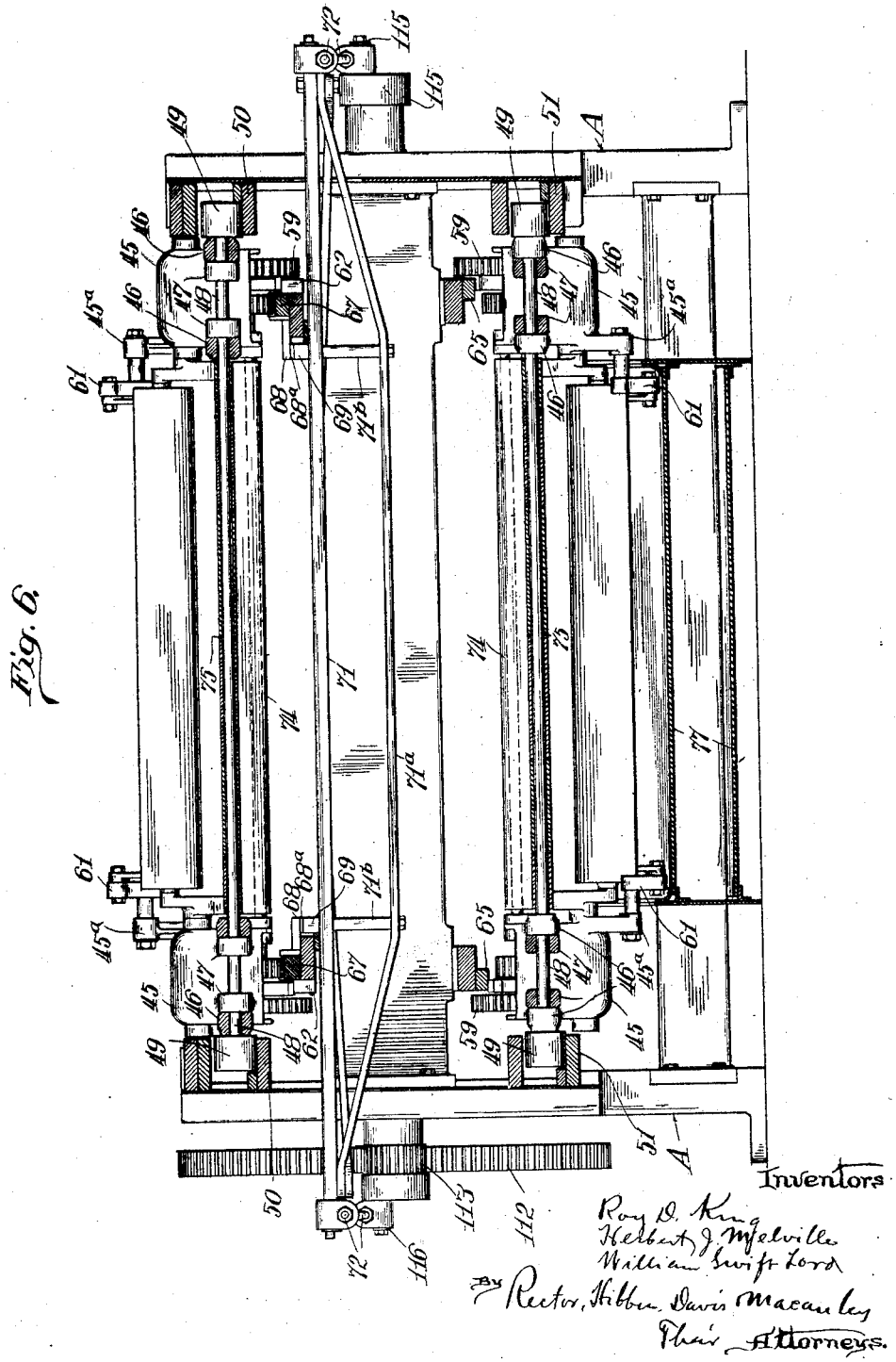

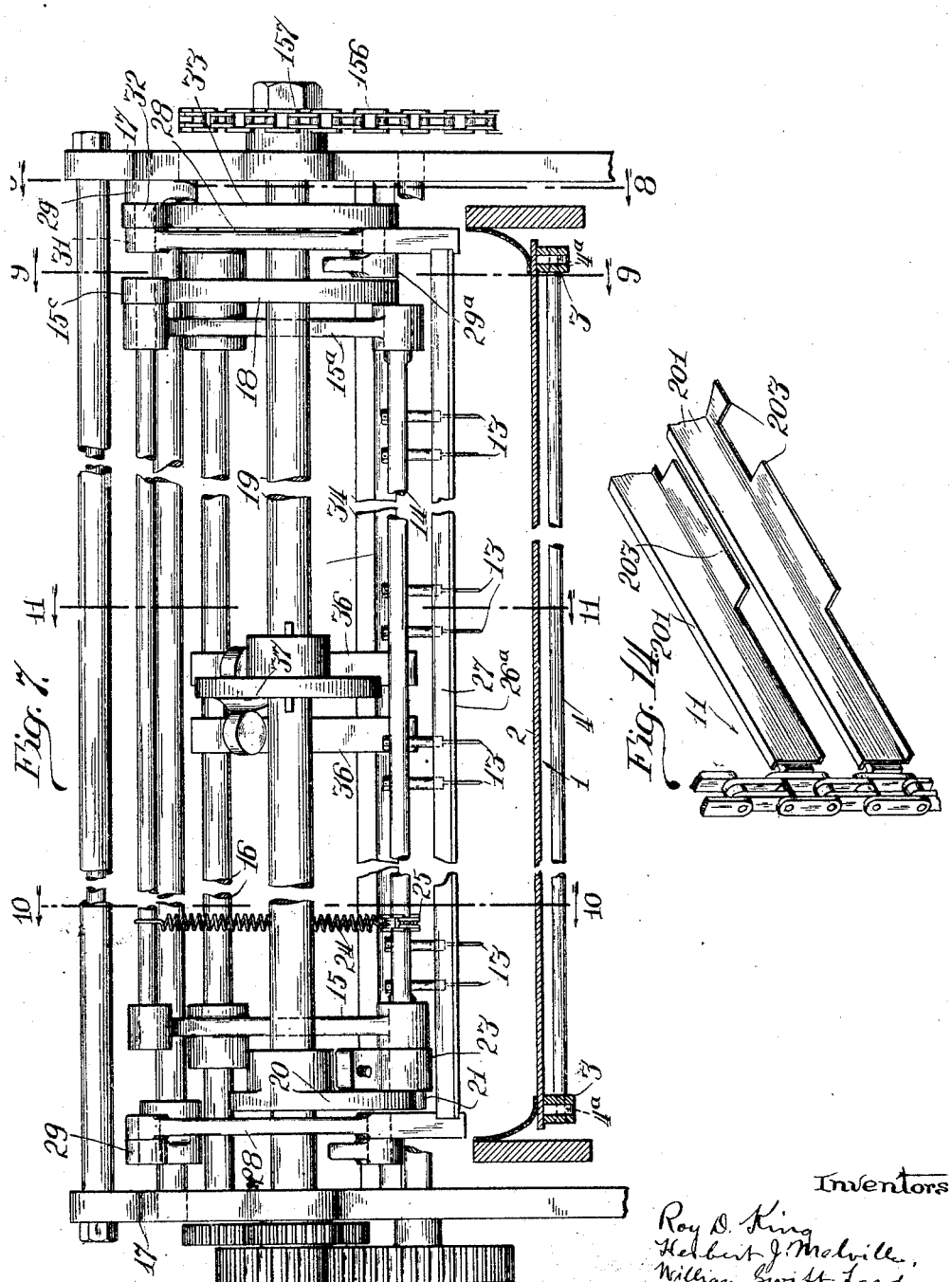

Nov. 30, 1926. 1,608,942
R. D. KING ET AL
MACHINE FOR COATING CONFECTIONS WITH NUTS
Filed May 25, 1925     11 Sheets-Sheet 8
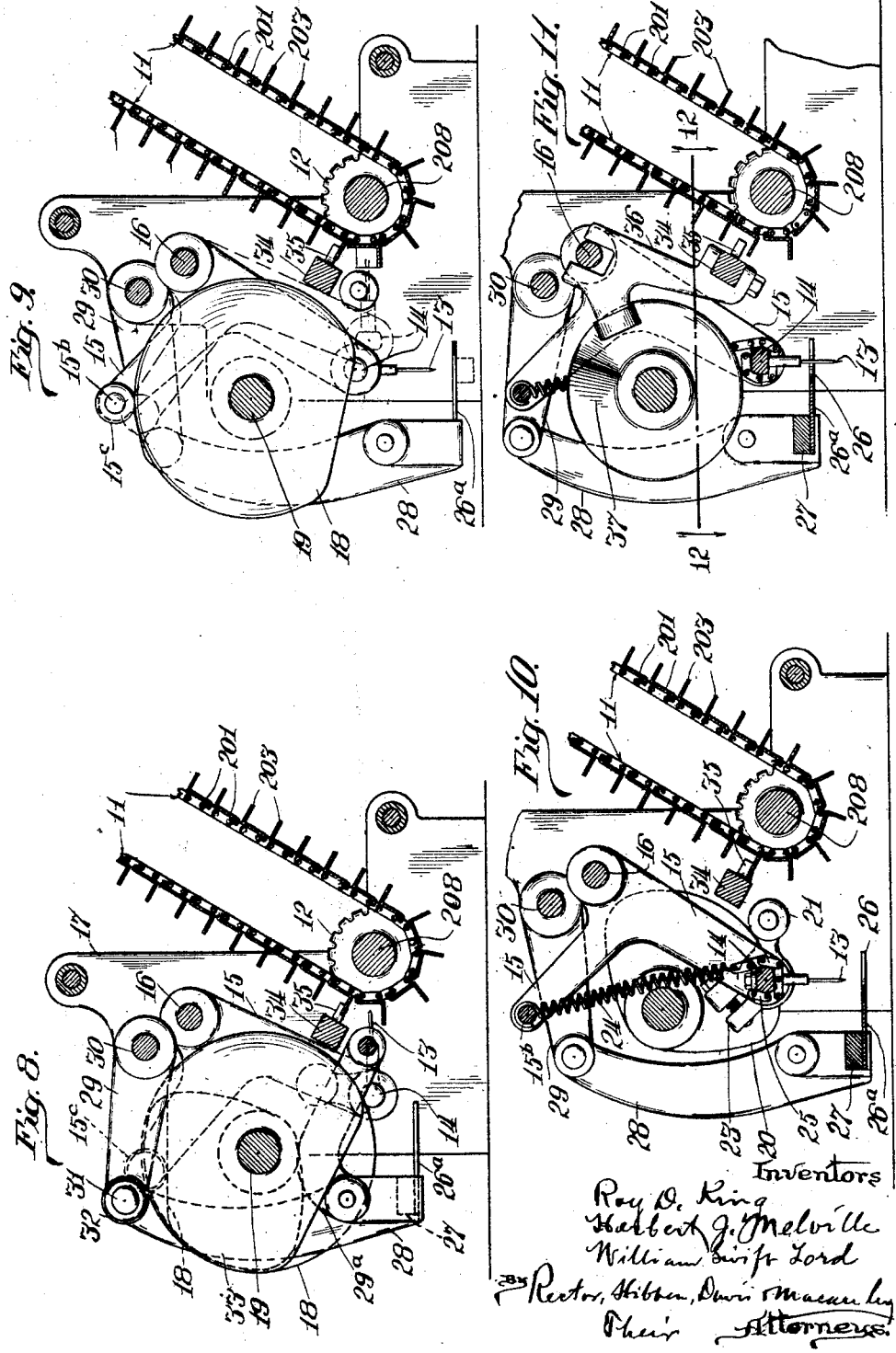

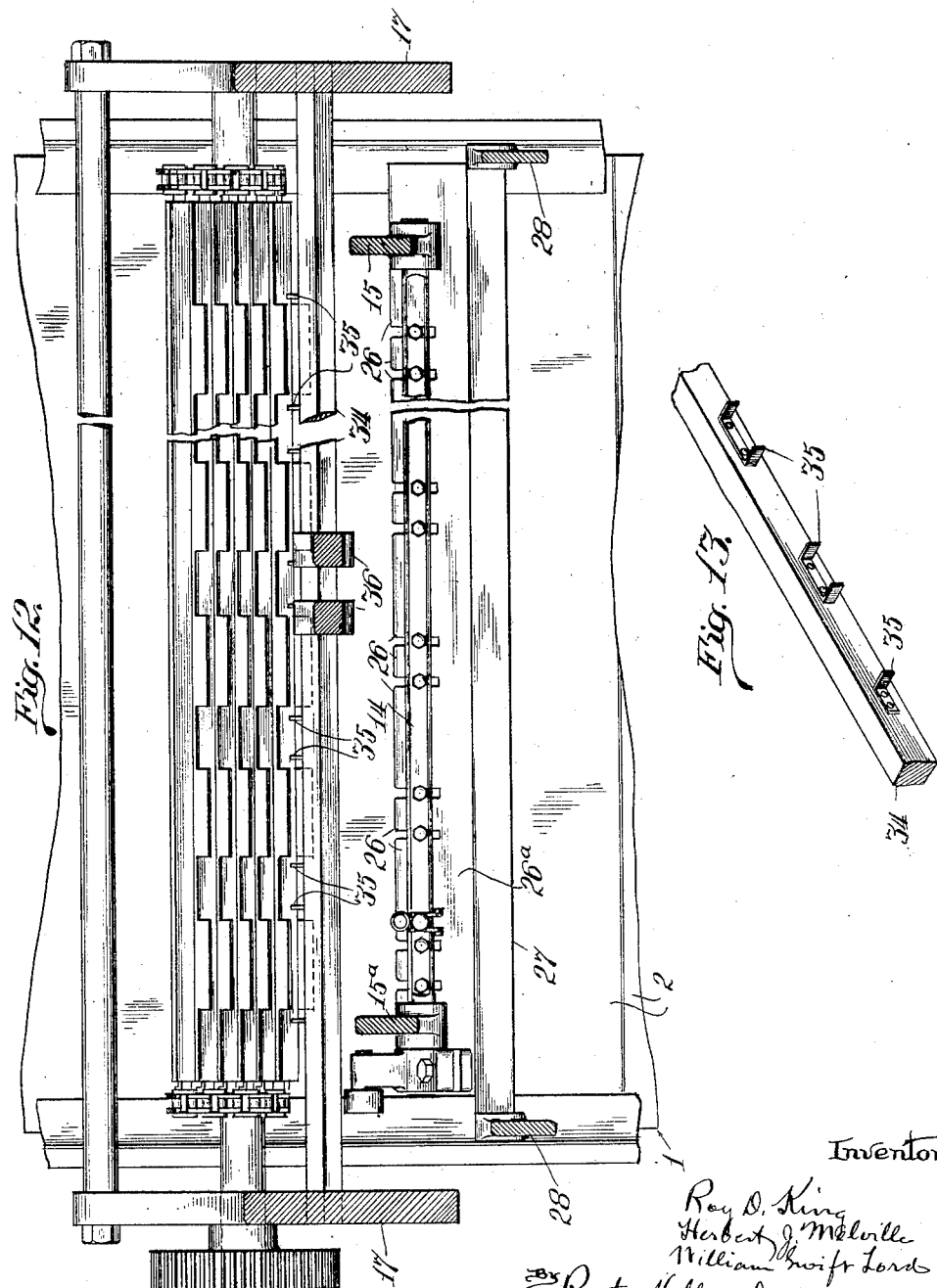

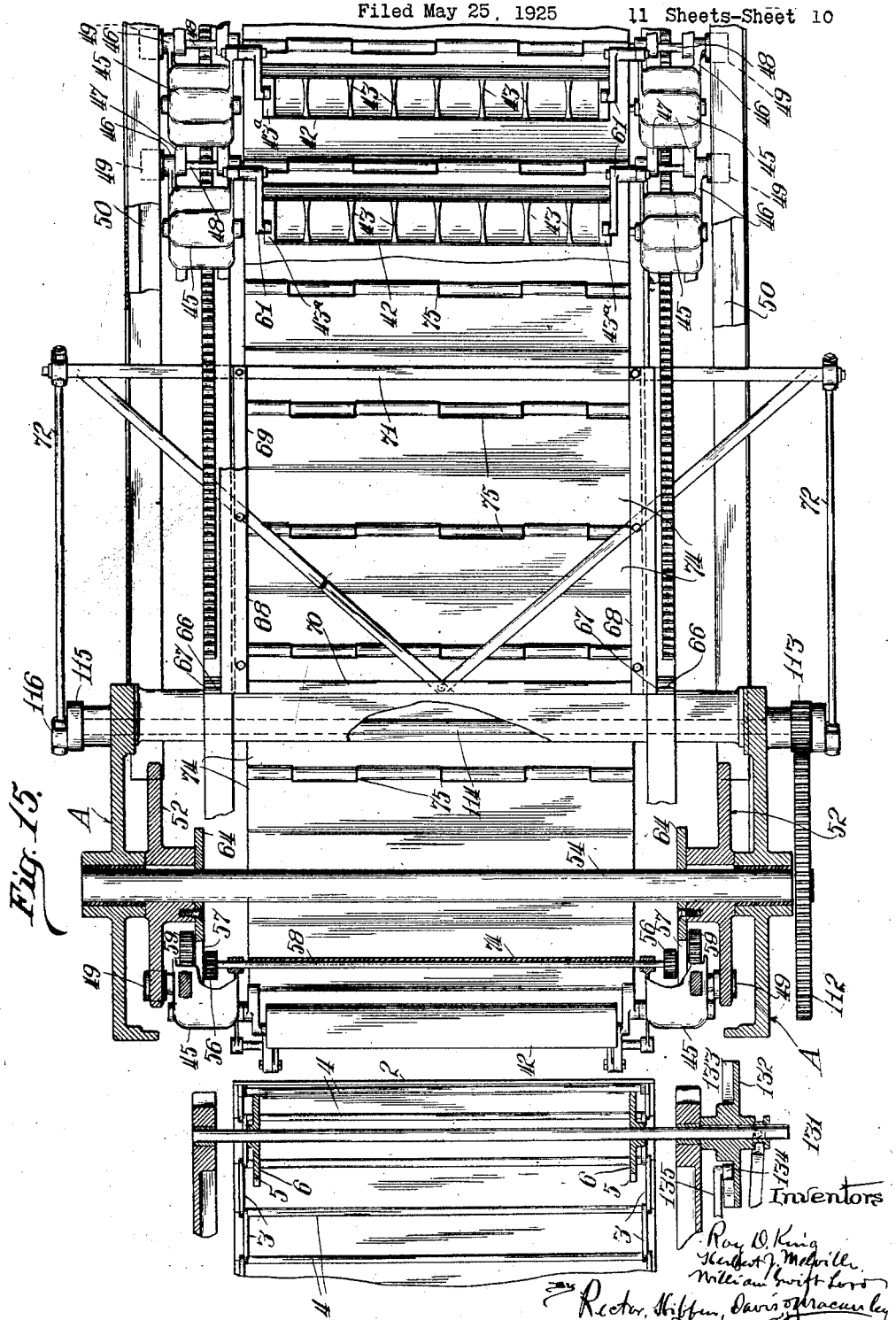

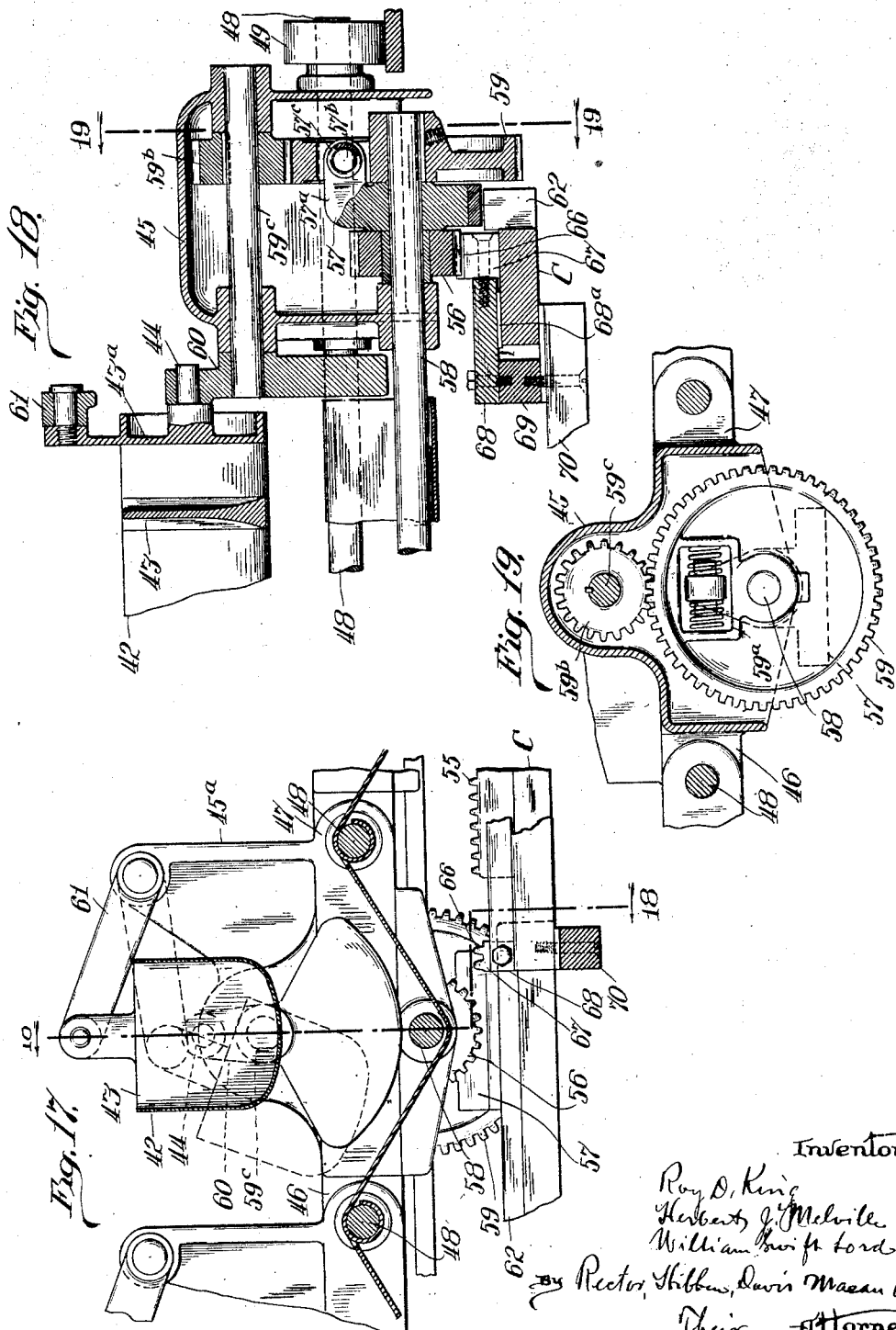

Patented Nov. 30, 1926.

1,608,942

UNITED STATES PATENT OFFICE.

ROY D. KING AND HERBERT J. MELVILLE, OF CHICAGO, AND WILLIAM SWIFT LORD, OF EVANSTON, ILLINOIS, ASSIGNORS TO WILLIAMSON CANDY COMPANY, OF CHICAGO, ILLINOIS, A CORPORATION OF ILLINOIS.

MACHINE FOR COATING CONFECTIONS WITH NUTS.

Application filed May 25, 1925. Serial No. 32,583.

Our novel machine for making confections is designed to accomplish the continuous production on a large scale of a class of confections consisting of a candy core or center, usually of a solid sugar cream composition, surrounded by a conglomerate layer of nuts, or in some cases other granular edibles, cemented to the core and to each other by a caramel or chocolate or other binding edible material, and usually (in the finished product) an outer coating of milk chocolate or similar material. Our machine, however, relates only to the process of coating the centers with the conglomerate layer of nuts and caramel or like material, and not to apparatus for applying the final milk chocolate coating. Confections of the type to which our invention relates have heretofore generally been made by hand work, which is slow, expensive and requires skilled labor, and does not produce a uniform product. The object of our invention is the provision of suitable and efficient apparatus, operating to carry out, according to the novel procedure and method hereinafter described in detail, successive steps in handling and treatment of the materials acted upon, and to accomplish production of the coated centers rapidly and on a large scale, at a relatively small cost for attendance of the machine by operatives. Our invention resides in such novel procedure and method of treatment of materials which we have devised to attain the ends in view, and also in the arrangement and combination of different groups of mechanisms which are employed collectively as parts of the apparatus for carrying out such method of treatment and in certain novel mechanisms and incidental novel features of construction of portions of such apparatus which will hereinafter be described in detail, the essential elements of our invention being pointed out in the appended claims; it being understood, however, that changes in the form and details of construction of various parts of the apparatus and variations by way of substitution of equivalents for particular elements or groups of associated elements may be made without departing from the spirit of our invention, and within the true scope and intendment of the claims.

In the accompanying drawings, which illustrate our invention in a desirable and preferred form, Figure 1 is an elevation of the front portion of the right side of the machine, employing the term "front" to designate the input end of the machine, and the expression "right" being applied with reference to the position as viewed from front to rear; Fig. 2 is a right side elevation of the rear position of the machine; Fig. 3 is a longitudinal central vertical section of the front portion of the machine, viewed from right to left; Fig. 4 is a similar section of the rear portion of the machine; Fig. 5 is a left side elevation of the front end of the machine; Fig. 6 is a vertical transverse section in a plane indicated by the dotted line 6—6 of Fig. 4; Fig. 7 is a transverse vertical section of the upper part of the machine in a plane indicated by the dotted line 7—7 of Fig. 3, viewed from front to rear, a number of parts beyond such plane being shown in elevation and omitted portions of continuous parts being indicated by breaking the parts away in alignment; Figs. 8, 9, 10 and 11 are detail views showing in longitudinal vertical section indicated by the dotted lines 8—8, 9—9, 10—10 and 11—11, respectively of Fig. 7 certain cam-actuated mechanisms employed in transferring the centers from the candy center conveyor to the front carrier belt; Fig. 12 is a horizontal section on the line 12—12 of Fig. 11; Fig. 13 is a fragmentary view of a portion of a spacing bar forming part of the center-transferring mechanism; Fig. 14 is a perspective of a part of the belt of such mechanism; Fig. 15 is a horizontal section of the rear portion of the machine in a plane indicated by the dotted line 15—15 of Fig. 2; Fig. 16 is a transverse vertical section on the line 16—16 of Fig. 4, looking from front to rear and showing in elevation a blower device for heaping up nuts on the caramel-covered centers after they have passed the second depositing mechanism; Fig. 17 is a fragmentary vertical section adjacent the front end of one of the bucket-actuating racks, looking towards the left of the machine and showing in elevation parts of one of the gear boxes; Fig. 18 is a section on the line 18—18 of Fig. 17; and Fig. 19 is a vertical section on the line 19—19 of Fig. 18.

Like reference characters indicate like parts in all the figures of the drawing.

Outlining first the general arrangement of the different parts and mechanism used in carrying out our invention, the following instrumentalities are employed. At the front end of the machine is arranged an intermittently movable carrier belt upon which, from a supply hopper above the front end of the belt, is laid down a bed of peanuts or other granular material employed in the production of the confection. Rearwardly of the supply hopper is arranged a depositing machine having a transverse row of discharge orifices through which measured charges of the semi-liquid viscous cementing material (generally heated caramel or a chocolate mixture) are intermittently deposited on the bed of nuts at intervals of rest of the carrier belt. Rearwardly of the discharge hopper is arranged mechanism for imposing a corresponding row of centers on top of the charges of cementing material, and rearwardly of this mechanism for so placing the centers is arranged a second hopper arranged to discharge covering charges of the cementing material on top of the centers, these steps also occurring during periods of rest of the belt. Rearwardly of the second hopper the centers thus coated pass beneath a blower mechanism having a row of nozzles so disposed that the jets of air passing therethrough act to heap up the loose peanuts adjacent the centers over their top surfaces, and at the rearward loop of the carrier belt the centers, carrying a layer of adherent nuts and surrounded by loose nuts, fall rearwardly into the boxes of a tumbling mechanism. This mechanism consists of cross rows of tumbling boxes or buckets which are supported upon members pivoted together in the form of a pair of opposite sprocket chains arranged to run over pairs of continuously driven sprocket wheels at the forward and rear loops of the sprocket structure. By mechanism which will later be described in detail these boxes are given an oscillatory tumbling movement during their travel from front to rear on the top reach of their travel, and the centers and adherent nuts are compacted into their desired final form by the time they have reached the rear end of the machine, where they are discharged from the boxes and by suitable transfer mechanism delivered to other apparatus with which the present invention is not concerned for such further treatment as may be desired.

Describing now in detail the construction of the particular embodiment of our machine illustrated in the drawings, the carrier belt 1 consists of cross slats 2 to the inner faces of which, adjacent and across their opposite ends, are secured links 3 formed with overlapping ends pivotally connected together by means of through pivot rods 4 extending across the belt structure and formed with reduced ends 4ª forming the opposite pivots. These pivot rods are arranged to make meshed engagement between the pivots 4ª with the sockets 5 formed at the angles of a rear pair of opposite polygonal sprocket wheels 6 (in the present instance, though not necessarily, hexagonal) fixed to a shaft 131 journaled in the frame work of the machine, and a front pair of similar sprocket wheels 6ª fixed to a cross shaft 131ª, also journaled in the machine frame. The shaft 131 is given an intermittent movement by means which will later be described.

The nut hopper 7, stationarily supported above the front end of the carrier belt, is formed with an open bottom immediately above the belt and an adjustable gate 8 at the lower part of its rearward side, so that as the belt moves rearwardly a layer of nuts of the desired thickness may be laid down upon it.

Rearward of the nut hopper is arranged the front caramel depositing mechanism 9, having a tank for the heated caramel and equipped with a suitable pumping mechanism communicating with a cross row of depositing jet orifices through which measured charges of caramel are arranged to be discharged upon the bed of nuts. Depositing mechanism suitable for this purpose are well known in the confectionary machinery art, and as the specific construction of this part of my machine is immaterial I have not illustrated it in detail, but have only illustrated the outline of a well known commercial depositing machine suitable for the purpose.

Rearward of this depositing machine is arranged a mechanism for placing upon the charges of caramel successive rows of centers as the belt intermittently comes to rest in position to receive the rows in succession. The centers, which usually consist of a sugar cream candy previously formed into oblong rectangular blocks, are placed by attendants of the machine upon the laterally extending shelves of an inclined endless conveyor belt 11 which at the bottom engages opposite sprocket wheels 12 immediately above the path of the carrier belt, and at the top passes around similar sprocket wheels adjacent a feed table (not shown) at which the attendants work. This table may conveniently be located on a floor of the building, or a suitable platform, above the floor on which the main frame and other portions of the machine are located.

This conveyor belt may conveniently be constructed as shown in the drawings, of strips of sheet metal 201 which at their ends are secured to transverse links which are pivoted together to form sprocket chains engaging the sprocket wheels 12. Extending forwardly and outwardly from the bottom of the strips 201 (referring to the position of the parts of the belt on the forward inclined reach of the conveyor) are small shelves 20³ which form the supports for the centers. The upper, inner edges of the strips may each be formed, as shown with a short right angled strengthening flange.

The centers are transferred from the conveyor belts to the carrier belt by means of a set of picker needles 13 mounted on a rock shaft 14 which is journaled in a rocking frame consisting of side members 15—15ᵃ connected at their top by a cross rod 15ᵇ, the members 15—15ᵃ being pivotally supported by a stationary cross rod 16 carried by side brackets 17 secured to the main frame of the machine. By a rocking movement of the rock shaft 14, the picker pins are caused to oscillate from the vertical position shown in Fig. 10 to a horizontal position, and by a rocking movement of the frame members 15 the rock shaft and picker needles are then caused to shift rearwardly to cause the needles to engage the centers on the conveyor (as shown in dotted lines in Fig. 9) and are then returned to the vertical position shown in Fig. 11, beneath stripper members which will later be described, and after the stripper members have descended and forced the centers down upon and well into the charges of caramel, the movements are repeated to transfer the next row of centers, and so on.

The oscillation of the frame members 15—15ᵃ is accomplished by means of a cam 18 fixed to a cam shaft 19 extending across the machine and journaled in the side brackets 17. This cam is arranged to cooperate with a cam roller 15ᶜ carried by the cross rod 15ᵇ adjacent the arm 15ᵃ, near the right side of the machine. The oscillation of the rock shaft 14 is accomplished by a cam 20 fixed to the cam shaft 19 which engages an antifriction roller 21 carried by an arm extending from a split block 23 arranged to be adjustably secured to the rock shaft at its end adjacent the left side of the machine. The shaft is under spring tension tending to hold the roller 21 against the cam 20, exerted through a spring 24 anchored to the cross rod 15ᵇ and connected by a chain 25 extending around and secured to the shaft.

The centers which are removed from the conveyor belt 11 by the picker needles 13 are stripped from the pins by the forwardly extending fingers 26 of a finger plate 26ᵃ secured to a stripper bar 27 which is secured to upwardly extending side arms 28, hung upon the rear ends of links 29 pivoted at their front ends upon a stationary cross rod 30 extending between the side brackets 17. A pair of opposite links 29ᵃ, pivoted at one end to studs near the lower ends of the side arms 28 and at their other end to a pair of short bolts or studs 29ᵇ extending inwardly from the side brackets 17, constrain the connected side arms and stripper bar to an up and down movement. On the right side of the machine the bolt 31 which forms the pivotal connection between the arm 28 and link 29 is provided with a roller 32 arranged to engage a cam 33 fixed to the cam shaft 19 to raise and lower the stripper frame.

We have provided an aligning mechanism for adjusting the position of the centers laterally so that they will be engaged properly by the picker needles, this mechanism comprising a square spacing bar 34 slidingly mounted in the side brackets 17 and equipped with spaced lugs 35 lying between the paths of movement of the conveyor shelves 20³ carrying the more or less inaccurately aligned centers. To this spacing bar is secured a pair of shifting arms 36, notched to engage the cross rod 16, which assists in maintaining them in position, such arms being equipped with a pair of opposite rollers engaging the opposite side faces of a disk cam 37 arranged to shift the spacing bar and lugs first in one direction and then in the other to align the centers.

Rearward of the center-transferring mechanism just described is arranged the second caramel depositing mechanism, which may be of the same construction as the first and operates to deposit on top of the centers a second measured charge of heated liquid caramel. As the centers imbedded in the caramel charges are carried rearward on the bed of nuts on the carrier belt they approach a line of jets of air issuing from the downwardly and forwardly directed nozzles 38 of a header pipe 39 connected with a blower mechanism. These jets are directed between the longitudinal lines or rows of centers and act to heap up the nuts over the centers, completely covering the centers and forming of each a ball consisting of the center and a layer of nuts enveloping the center and cemented thereto, surrounded by a surplus of loose nuts. The pressure of the blast of air forced into the header from the source of air supply (not shown) is regulated by a damper 39ᵃ arranged in the air passage leading into the header. The portion of the belt lying immediately to the front of the air nozzles, it may here be explained, is preferably covered by a hood 40 communicating with a large outlet pipe 41, which serves to conduct the air away from the machine, carrying with it such lighter particles of nuts, husks, etc. as may be dislodged by the air jets.

At each rearward step of the carrier belt 1, one of the cross slats 2 passes from horizontal position to an inclined position parallel with the corresponding faces of the rear hexagonal sprocket wheels 6, and dumps each coated center and the surrounding loose nuts into one of the boxes of the continuously traveling tumbling mechanism, which is so timed as to present a row of tumbling boxes or buckets in position to receive the centers at each such belt movement.

Describing now in detail the construction of the tumbling mechanism, the tumbling boxes or buckets into which the centers are individually dumped are in the present instance formed by dividing a relatively deep round-bottomed and straight-sided sheet metal trough member 42 extending transversely of the machine into separate compartments by means of cross partitions 43. The end walls 43$^a$ of each member 42 are formed with a trunnion 44 which are pivotally supported by crank pins carried by opposite crank members rotatably mounted in one of two chains of opposite gear boxes 45. These gear boxes are formed with front and rear pivot lugs or ears, marked 46 and 47, respectively, which are arranged in overlapping relation and are pivoted one to the other upon pivot rods 48 to form a pair of endless chains. These pivot rods extends across the machine and at their opposite ends are equipped with rollers 49 which at the top reach of the tumbling box belt ride upon a track rail 50, and at the bottom reach ride upon a similar track rail 51, both rails being secured at their front ends to a frame casting A and at their rear ends to a frame casting B and such rail members themselves forming a part of the frame of the machine.

Forwardly and rearwardly slightly beyond the ends of the track rails 50 and 51 the rollers 49 on the pivot rods connecting the two chains of gear boxes engage opposite sprocket wheels 52 which are formed with notches 53 arranged to engage the rollers in their passage from one track to the other. These sprocket wheels are fixed to cross shafts 54 and 54$^a$, the rear shaft 54$^a$ being continuously driven through connections to be hereinafter described to drive the connected gear boxes and tumbling buckets, which may be termed the bucket belt, in such manner as to bring the buckets successively into position to receive the coated centers from the carrier belt.

Below and adjacent the path of travel of the gear boxes along the upper reach of the bucket belt is arranged a pair of racks 55 secured to longitudinal bars C which form a part of the machine frame and are rigidly secured to the front and rear frame castings A and B. At opposite sides of the machine these racks are arranged to engage opposite and corresponding pinions 56 secured to the hubs of locking shoe members 57 rotatably mounted on cross-rods 58 journalled in the gear boxes 45 to cause a rolling, rotative movement of the pinions and connected shoe members while so engaged. These shoe members are formed with laterally projecting lugs 57$^a$ extending into openings formed in gear wheels 59$^a$ which are keyed to the cross-rods 58. The lugs 57$^a$ of the shoe members are formed with studs 57$^b$ to support buffer springs 57$^c$ which form a cushioned connection between the pinions 56 and 59. The pinions 59 in turn mesh with pinions 59$^b$ fixed to short crank shafts 59$^c$ journaled in the gear boxes.

The rotary motion thus given each pair of opposite pinions 59$^b$ is employed to impart a compound vibratory movement to the corresponding box member 42 by means of counterweighted cranks 60 which are rigidly secured to the crank shafts 59$^c$ and at their ends are formed with pivot bearings in which the trunnions 44 of the box members are mounted. At the opposite ends of the box member its end walls 43$^a$ are formed with upwardly extending arms 43$^b$ which are pivotally connected by links 61 with the upper ends of upwardly extending posts 45$^a$ integral with the corresponding gear boxes 45, this link connection operating to control the position of the box member as it is actuated by movement of the cranks 60. It results from this construction that as the cranks are rotated they will impart to the box member a rising and falling vibratory movement, and that this movement will continue so long as the pinions 56 of the corresponding gear boxes are in engagement with the racks 55.

Forwardly of the ends of the racks 55 below and adjacent the path of travel of the flat lower faces of the shoe members 57, are arranged locking rails 62 which before the pinions 56 make engagement with the racks cooperate with such shoes to prevent their rotation and rotation of the connected gear members, and rearwardly of said racks are arranged similar locking rails 63 which prevent rotation of the pinions after they have left said racks.

Secured to the cross shafts 54 and 54$^a$ and between the pairs of sprockets wheels 52 are arranged pairs of opposite hexagonal locking wheels or plates 64 which lie in the same longitudinal plane as the locking shoe members 57 and rails 62 and 63, and which are formed with peripheral faces arranged to cooperate with the inner flat faces of such shoe members to prevent their rotation before the shoe members 57 engage the rails 62 and after they leave the rails 63. Adjacent the lower reach of the box belt the shoes cooperate with a rail 65 which in like manner prevents rotation of the gear members so that the gearing is free to rotate and cause vibration of the tumbling boxes only while it is connected with the racks.

Inasmuch as the inertia of the box belt members and connected gearing members for producing the vibrating movement above described is considerable, it is highly desirable to provide means for gradually initiating this movement before the pinions 56 engage the forward ends of the racks 55. To this end we have provided opposite pairs of reciprocating teeth 66 which engage the pinions 56 while moving with them at the same speed as the box belt, and which slow down to a momentary position of rest while the pinions enter upon engagement with the racks, after which the teeth, then disengaged, return to make similar engagement with the succeeding pair of pinions.

The opposite pairs of reciprocating teeth 66 are formed upon blocks 67 which are respectively bolted to longitudinally disposed slide bars 68 equipped with wear plates 68ª arranged to slidingly overhang and ride upon the inner portions of the upper faces of the longitudinal frame bars C before mentioned. Secured to these slide bars 68 and in effect forming a part of them are bars 69 connected at their front ends by a cross bar 70 which extends under the frame bars C. At their rear ends the bars 69 are connected by a cross bar 71 which extends at its opposite ends beyond the side frame members of the machine and is equipped with blocks pivotally connected to pitman rods 72 by which the connected sliding frame members are reciprocated. To stiffen the cross bar 71 and strengthen the reciprocating frame such bar is provided with a truss rod 71ª and struts 71ᵇ between the bar and truss rod.

It will be understood that since (as in the case of all reciprocating parts operated by crank connection with a rotary member) the movement of the reciprocating member accelerates from a momentary stationary position at the end of a stroke in either direction to a maximum speed at the center of the stroke, and since the gear ratios of the parts of the machine are such that the speed of the double teeth at the center of the stroke is the same as the continuous speed of the box belt, the teeth of the pinions 56 which follow the reciprocating teeth as they are beginning a stroke in a rearward direction will gain upon the double teeth during the first half of such rearward stroke, and the gear ratios and arrangement are such that they will enter into engagement with them approximately (or it may be exactly) at the middle of such stroke, at which point the shoes 57 will clear the rails 62, so that the pinions and connected gearing may be free to rotate. The slowing down of the movement of the double teeth during the last half of the rearward stroke will then initiate a rotary movement of the pinions 56 and cause an acceleration of such rotary movement until at the end of the stroke of the reciprocating teeth the pinions will be rotating at full speed as they pass off such teeth onto the racks.

Inside the path traversed by the tumbling boxes, the bucket belt is provided with a jointed shield consisting of leaves 74 which are bent each along a central line to extend under the cross rods 58 and are formed with side portions spreading at an obtuse angle and formed with spaced marginal rolls in alternating arrangement to form hinge joints 75 encircling the pivot rods 48 as pintles.

From the description of the tumbling mechanism above given it will be readily understood that the centers, individually deposited in the tumbling boxes with a charge of loose nuts, are subjected to a vigorous tumbling action as the box members successively come into connection with racks and are given a vibratory motion, and continue such movement until the connection with the racks is broken, with the result of compacting the adherent nuts into the caramel coating and adjacent portion of the centers to form solid blocks free from the portion of the nuts which did not become attached to the conglomerate masses. Such loose nuts as are thrown out of the tumbling box by the tumbling action are caught by the jointed shield and carried rearwardly to the rear loop of the belt where they are then discharged upon the top of an endless return belt 77 hereinafter described.

These coated centers are dumped out of the buckets onto a screen consisting of a set of parallel inclined rods 76 which permit the loose nuts to fall through their interstices onto an inclined chute 76ª, which latter directs them to the forwardly traveling top reach of the endless conveyor belt 77 before mentioned, which is arranged to run over an idler drum 78 at the rear end of the machine and over a driving drum 78ª at the front end of the machine. The surplus nuts thus returned by the belt are there deposited upon an inclined plate 79 arranged to direct them into the path of the buckets 80 of a vertical elevator belt 81, which latter is arranged to lift the nuts and discharge them into a chute 82 through which they are returned to the supply hopper 7.

The driving connections by means of which the mechanism hereinbefore described are driven may vary considerably in arrangement, but a brief description of the particular means illustrated will be given.

The main drive shaft 100 of the machine, to which power is imparted from a suitable source through a large pulley 101 fast to the right hand end of said shaft, which extends across the rear end of the machine, carries upon its left end a small gear wheel 102 which meshes with a large gear wheel 103 fast upon a shaft 104 to which is secured a small gear wheel 105 at the right side of the machine. This small gear wheel meshes with a large gear wheel 106 secured to the cross shaft 54ª to which are fixed the pair of rear sprocket wheels 53 which drive the bucket belt and through such belt drive the front sprocket wheels 53 secured to the cross shaft 54.

A small sprocket wheel 107 on the left end of the shaft 54ª is in the present instance employed to drive a sprocket chain 108 and through a second sprocket wheel on a cross shaft 110 actuate a discharge conveyor 111 to convey the coated and compacted centers to a point beyond the present machine for further treatment.

Fast to the front cross shaft 54 to which the front sprocket wheels are secured is secured a large gear wheel 112 arranged to mesh with a small gear wheel 113 secured to a through shaft 114. This shaft is equipped at its opposite ends with a pair of wrist plates 115 formed with wrist pins 116 arranged to operate the pair of pitman rods 72 which are pivotally connected to opposite ends of the rear cross rod 71 forming part of the reciprocating frame on which the double teeth 66 of the tumbling mechanism are carried.

The connections for driving the carrier belt and other parts at the front end of the machine include a sprocket chain 117 engaging a sprocket wheel 118 on the right end of the shaft 104 before mentioned and also a sprocket wheel 119 rotatably mounted above the machine and arranged through sprocket chains 120 and 121 and suitably connected sprocket wheels to rotate a cross shaft 122 journaled in suitable bearings carried by the side frame members of the machine. This shaft has secured to it a small sprocket wheel 123 connected by a sprocket chain 124 with a sprocket wheel 125 on a cross shaft 126 journaled in bearings at the sides of the machine. Through a small sprocket wheel 127 on said shaft 126, a sprocket chain 128, and a sprocket wheel 129 fixed to a shaft 130, power is transmitted to the latter to continuously rotate it. This movement of the shaft 130 is periodically transmitted through a Geneva movement to the shaft 131 to which are fixed the rear hexagonal sprocket wheels 6 which engage the pivot rods connecting the slats of the carrier belt 1 to bring about the intermittent movement of such belt.

The parts of the Geneva movement include a disk 132 secured to the shaft 131 and formed with radial slots 133 arranged to be engaged by rollers 134 mounted on diametrically opposite arms 135 secured to the shaft 130, and locking blocks 136 fixed to said shaft 130 and having segmental faces arranged to slidingly cooperate with correspondingly shaped notches 137 formed in the periphery of the disk 132 and hold the disk and connected parts in stationary position during the intervals between cooperative engagement of the rollers with the slots.

To provide connections for driving the return belt 77 and various other parts of the machine the shaft 122 is provided at its right end with a sprocket 138 connected by a sprocket chain 139 with a sprocket wheel 140 on a shaft 141 which runs across the machine, and which carries on its left end a small sprocket wheel 142 connected by a chain 143 with a sprocket wheel 144 secured to a through shaft 145 to which the driving drum 80 of the return belt 77 is fixed.

At the right hand side of the machine the shaft 145 carries a sprocket wheel 146 which is connected by a sprocket chain 147 with a sprocket wheel 148 fast on a shaft 149 to which are secured sprocket wheels 150 arranged to engage links of the vertical bucket conveyor by which the surplus nuts are elevated in the buckets 80 to be returned to the supply hopper.

The cam shaft 19 of the picker mechanism is driven from the cross shaft 141 by a train of connection comprising a sprocket wheel 151 fixed to said shaft at its right end, a sprocket chain 152, a sprocket wheel 153 engaged by said chain and fixed to a cross shaft 154, a second sprocket wheel 155 also secured to said shaft adjacent the sprocket wheel 153, a sprocket chain 156, and a sprocket wheel 157 engaged by said last mentioned chain and secured to said cam shaft.

For the purpose of driving the inclined conveyor belt 11, the left end of the cam shaft 19 is equipped with a small gear wheel 204 meshing with a larger gear wheel 205 fixed to a shaft which is rotatably supported in the left bracket 17 and to which is secured a pinion 206 arranged to mesh with a gear wheel 207 fast to the shaft 208 to which the sprocket wheels 12 engaging the chain members of the belt are secured.

While the specific construction of the caramel depositing mechanism forms no part of our present invention it may be added that in the present instance the front depositing mechanism is driven by a pitman rod 158 connected to a wrist pin on a wrist plate 159 fixed to the cross shaft 154 at its left end, and the rear depositing mechanism is driven by a similar connection secured to the cross shaft 126.

It will be understood that while the complete machine illustrated and above described in detail is adapted to produce confections of the specific form and character described, it may also be used, by the disconnection or omission of certain mechanisms, or by running them idly, to produce other confections as well. For instance, the covering charges of caramel may be omitted, in which case one face of the centers will not be coated with nuts; or the centers may be omitted and a single charge or double charges of caramel used, and in the latter case the charges may be either of the same character or differently flavored or colored, to produce a variety of different confections in the form of balls of nuts cemented together by the cementing material; or the tumbling mechanism may be omitted, and in such case the remaining parts of the machine may be employed to produce other varieties of confection not compacted solidly in the manner described. By suitable changes in proportions of the parts, the machine may be adapted to handle centers of different form than that illustrated, so that our invention may be employed to produce a great variety of desirable and attractive confections.

While in the foregoing description and the claims appended we have for convenience of description described the materials used as "nuts" and "caramel", and sugar cream "centers", it will be understood that our invention is not restricted to the specific materials mentioned, and that any other suitable materials capable of being treated in like manner are within the true scope and intent of the claims.

We claim:

1. The method of applying coatings of nuts to confection centers which consists in maintaining a traveling bed of nuts, depositing spaced charges of viscous cementing material on said bed while in transit, then in transit imposing the centers on such charges of material, then in transit depositing covering charges of the cementing material on said centers, then in transit covering the covering charges with nuts, and then tumbling the centers with surplus nuts to compact them.

2. The method of applying coatings of nuts to confection centers which consists in maintaining a traveling intermittently moving bed of nuts, depositing spaced charges of viscous cementing material on said bed during its intervals of rest, imposing the centers on such charges of material during succeeding intervals of rest, depositing covering charges of the cementing material on said centers during succeeding intervals of rest, then covering the covering charges with nuts, and then tumbling the centers with surplus nuts to compact them.

3. The method of applying coatings of nuts to confection centers which consists in maintaining a traveling bed of nuts, depositing in lines running longitudinally of the belt spaced charges of viscous cementing material on said bed while in transit, then in transit imposing the centers on such charges of material, then in transit depositing covering charges of the cementing material on said centers, then in transit upheaving the bed of nuts between the lines of centers to heap surplus nuts upon the covering charges of material, and then tumbling the centers with surplus nuts to compact the centers and nuts adherent thereto.

4. The method of applying coatings of nuts to confection centers which consists in maintaining a traveling bed of nuts, depositing in lines running longitudinally of the belt spaced charges of viscous cementing material on said bed while in transit, then in transit imposing the centers on such charges of material, then in transit depositing covering charges of the cementing material on said centers, then in transit subjecting the bed of nuts between the lines of centers to jets of air acting to heap surplus nuts upon the covering charges of material, and then tumbling the centers with surplus nuts to compact the centers and nuts adherent thereto.

5. The method of applying coatings of nuts to confection centers which consists in maintaining a traveling bed of nuts, depositing spaced charges of viscous cementing material on said bed while in transit, then in transit imposing the centers on such charges of material, then in transit depositing covering charges of the cementing material on said centers, then in transit covering the covering charges with nuts, then in transit separating the bed of centers and nuts into individual positions comprising each one center and a proportionate part of the surplus nuts, and then separately tumbling such portions.

6. The method of applying coatings of nuts to confection centers which consists in maintaining a traveling intermittently moving bed of nuts, depositing in lines running longitudinally of the belt spaced charges of viscous cementing material on said bed during its intervals of rest, imposing the centers on such charges of material during succeeding intervals of rest, depositing covering charges of the cementing material on said centers during succeeding intervals of rest, then in transit upheaving the bed of nuts between the lines of centers to heap surplus nuts upon the covering charges of material, and then tumbling the centers with surplus nuts to compact the centers and nuts adherent thereto.

7. The method of applying coatings of nuts to confection centers which consists in maintaining a traveling intermittently moving bed of nuts, depositing in lines running longitudinally of the belt spaced charges of viscous cementing material on said bed during its intervals of rest, imposing the centers on such charges of material during succeeding intervals of rest, depositing covering charges of the cementing material on said centers during succeeding intervals of rest, then in transit subjecting the bed of nuts between the lines of centers to jets of air acting to heap surplus nuts upon the covering charges of material, and then tumbling the centers with surplus nuts to compact the centers and nuts adherent thereto.

8. The method of applying coatings of nuts to confection centers which consists in maintaining a traveling bead of nuts, depositing spaced centers and viscous cementing material enveloping said centers upon said bed of nuts while in transit, then in transit separating the bed of centers and nuts into individual positions comprising each one center and a proportionate part of the surplus nuts, and then separately tumbling such portions.

9. The method of applying coatings of nuts to confection centers which consists in maintaining a traveling bed of nuts, depositing spaced centers and viscous cementing material enveloping said centers upon said bed of nuts while in transit, then in transit subjecting the bed of nuts between the centers to jets of air acting to heap surplus nuts over the enveloped centers, and then tumbling the centers with surplus nuts to compact the centers and nuts adherent thereto.

10. The method of applying coatings of nuts to confection centers which consists in maintaining a traveling bed of nuts, depositing spaced centers and viscous cementing material enveloping said centers upon said bed of nuts while in transit, then in transit subjecting the bed of nuts between the centers to jets of air acting to heap surplus nuts over the enveloped centers, then in transit separating the centers and nuts into individual portions comprising each one center and a proportionate part of the surplus nuts, and then separately tumbling such portions.

11. A method of forming confections which includes maintaining a traveling bed of nuts, intermittently depositing thereon while in transit measured charges of a candy cementing material and separating the loose nuts from the bodies of coherent nuts.

12. A method of forming confections which includes maintaining a traveling bed of nuts, intermittently depositing thereon while in transit measured charges of viscous cementing material, imposing on said charges blocks of solid confection material, and separating the loose nuts from the bodies of coherent blocks and nuts.

13. A method of forming confections which includes maintaining a traveling bed of nuts, intermittently depositing thereon while in transit measured charges of viscous cementing material, imposing and pressing down into said charges solid blocks of confection material, and separating the loose nuts from the bodies of coherent blocks and nuts.

14. In a machine for forming confections, an intermittently movable carrier belt, means for laying down a bed of nuts on said belt, and automatic means for depositing measured charges of candy cementing material on said bed of nuts during the intervals of rest of the carrier belt.

15. In a machine for forming confections, a carrier belt, means for laying down a bed of nuts on said belt, means for depositing measured charges of candy cementing material on said bed of nuts, and means for imposing blocks of solid confection material on said charges of cementing material.

16. In a machine for forming confections, a carrier belt, means for laying down a bed of nuts on said belt, means for depositing measured charges of candy cementing material on said bed of nuts, means for imposing blocks of solid confection material on said charges of cementing material, and means for depositing covering charges of cementing material on said blocks.

17. In a machine for forming confections, a carrier belt, means for laying down a bed of nuts on said belt, means for depositing measured charges of candy cementing material on said bed of nuts, means for imposing blocks of solid confection material on said charges of cementing material, means for depositing covering charges of cementing material on said blocks, and means for covering said covering charges with nuts.

18. In a machine for forming confections, a carrier belt, means for laying down a bed of nuts on said belt, means for imposing on said bed of nuts blocks of solid confection material in spaced rows, means for depositing measured covering charges of candy cementing material on said blocks, and means for covering said covering charges with nuts.

19. In a machine for forming confections, a carrier belt, means for laying down a bed of nuts on said belt, means for imposing on said bed of nuts blocks of solid confection material in spaced rows, means for depositing measured covering charges of candy cementing material on said blocks, and means for dislodging nuts from the bed of nuts between the rows arranged to heap the dislodged nuts over said candy-covered blocks.

20. In a machine for forming confections, a carrier belt, means for laying down a bed of nuts on said belt, and a plurality of depositing mechanisms for respectively depositing registering rows of measured charges of candy cementing material on said bed of nuts.

21. In a machine for forming confections, an intermittently movable carrier belt, automatic means for laying down a bed of nuts on said belt, means for depositing charges of candy cementing material on said bed of nuts, during the intervals of rest of the carrier belt, and means for tumbling the agglomerated bodies of nuts and cementing material.

22. In a machine for forming confections, a carrier belt, means for laying down a bed of nuts on said belt, means for depositing spaced rows of charges of candy cementing material on said bed of nuts, means for dislodging nuts from the bed of nuts between the rows arranged to heap the dislodged nuts upon said charges, and means for tumbling the agglomerated bodies of nuts and cementing material.

23. In a machine for forming confections, a carrier belt, means for laying down a bed of nuts on said belt, means for depositing charges of candy cementing material on said bed of nuts, means for covering said charges with nuts, and means for tumbling the agglomerated bodies of nuts and cementing material.

24. In a machine for applying coatings of nuts to confection centers, a carrier belt, means for laying down a bed of nuts on said belt, means for depositing charges of viscous cementing material on said bed of nuts, means for depositing centers on said charges of material, means for depositing covering charges of cementing material on said centers, means for covering said covering charges with nuts, and means for tumbling said centers and adherent nuts to compact them.

25. In a machine for applying coatings of nuts to confection centers, an intermittently movable carrier belt, means for laying down a bed of nuts on said belt, depositing mechanism arranged to intermittently discharge a spaced row of charges of viscous cementing material on said bed of nuts, means for depositing centers on said charges of material, a second depositing mechanism arranged to intermittently discharge covering charges of material on said centers, and tumbling mechanism adjacent the discharge end of the carrier belt arranged to successively receive and tumble the rows of centers so coated at successive movements of the carrier belt.

26. In a machine of the character described, an intermittently movable endless carrier belt comprising transverse sections hinged together, means for laying down a bed of nuts on said belt, means for imposing on said bed of nuts rows of centers arranged one row above each belt section, polygonal supporting means for said belt arranged at each step of the belt to bring the rearmost horizontal section to inclined position to discharge the centers and nuts thereon, and a tumbling mechanism including a plurality of traveling tumbling box members arranged to come successively to position adjacent the forward angle of the belt section to receive the centers and nuts discharged by the belt sections.

27. In a machine for applying coatings of nuts to confection centers, a carrier belt, means for laying down a bed of nuts on said belt, means for imposing on said bed of nuts spaced rows of centers, means for enveloping said centers with viscous cementing material, and a blower device having a plurality of jet openings arranged to direct jets of air between said centers to dislodge nuts from the bed and heap them over said centers.

28. In a machine for applying coatings of nuts to confection centers, a carrier belt, means for laying down a bed of nuts on said belt, means for imposing on said bed of nuts spaced rows of centers, means for enveloping said centers with viscous cementing material, and means for dislodging nuts from said bed of nuts arranged to heap the dislodged nuts over said centers.

29. A machine provided with mechanism according to claim 29 in which said blower device includes a header communicating with air under pressure, a series of downwardly and forwardly inclined nozzles, and a hood arranged over the portion of said carrier belt to the rear of said nozzles, said hood communicating with an outlet pipe.

30. A machine provided with mechanism according to claim 29 in which said blower device is provided with means for regulating the passage of air therethrough.

31. In a machine of the character described having a horizontal carrier belt and a center-conveyor belt thereabove provided with shelves for holding cross rows of centers, mechanism for transferring the centers including a laterally movable oscillating shaft equipped with needles arranged to engage centers on the conveyor belt laterally and deposit the centers on the carrier belt vertically.

32. In a machine of the character described having a horizontal carrier belt and a center-conveyor belt thereabove provided with shelves for holding cross rows of centers, mechanism for transferring the centers including an oscillating shaft mounted in a rocking frame arranged to swing laterally, said shaft being equipped with needles arranged to be oscillated to horizontal position to engage the centers by a lateral movement of the frame and to be oscillated to vertical position to deposit the centers on the carrier belt.

33. In a machine of the character described having a horizontal carrier belt and a center-conveyor belt thereabove provided with shelves for holding cross rows of centers, mechanism for transferring the centers including a rocking frame arranged to swing laterally, an oscillating shaft mounted in said frame and equipped with needles arranged to be oscillated between horizontal engaging position and vertical disengaging position, and a vertically movable stripper member, 34. A machine provided with mechanism according to claim 35 in which said stripper member is a horizontal plate equipped with fingers and mounted in a frame connected at its opposite ends by parallel links to the machine frame.

35. A machine provided with mechanism according to claim 35 and provided with a cam arranged to positively rock said oscillating shaft in one direction and with a spring on said frame connected to said shaft and arranged to return it.

36. A machine provided with mechanism according to claim 35 and having a cam shaft equipped with a cam operatively connected with said rocking frame, and with a cam operatively connected with said oscillating shaft, and with a cam operatively connected with said stripper member; said cams being arranged to actuate said parts in timed relation, substantially as described.

37. In a machine of the character described having a horizontal carrier belt and a center-conveyor belt thereabove provided with shelves for holding cross rows of centers, mechanism for transferring the centers including a laterally movable frame, an oscillating shaft in said frame equipped with picker needles arranged to be oscillated from vertical to horizontal position and vice versa, and a vertically movable stripper member, operating connections arranged to shift said frame laterally back and forth while said needles stand in horizontal position and said stripper member is in upper position, and operating connections for shifting said stripper member downwardly and back while said needles stand in vertical position.

38. In a machine for forming confections and having a carrier belt and means for laying down a bed of nuts on said belt, means for imposing blocks of solid confection material on said bed of nuts including movable picker needles arranged to engage said block and a stripper member arranged to strip said blocks from said needles and press them down into said bed of nuts on the carrier belt.

39. In a machine for forming confections and having a carrier belt and means for laying down a bed of nuts on said belt, means for imposing blocks of solid confection material on said bed of nuts including a set of oscillating picker needles above and adjacent said bed of nuts and arranged to impale said blocks horizontally and shift to vertical position, and a vertically movable stripper member arranged to strip said blocks from said needles and press them down into said bed of nuts on the carrier belt.

40. A machine provided with mechanism according to claim 37 in which said oscillating shaft is actuated by a rotary cam having a dwell during which said movable frame makes a reciprocation and having another dwell during which said stripper member makes a reciprocation.

41. In a machine of the character described and having a movable center-conveyor belt provided with cross rows of short spaced shelves for individually holding centers, means for evenly spacing the centers on the shelves including a sliding bar parallel with said rows of shelves and equipped with rows of fingers, said fingers being in alignment with spaces between said shelves in normal central position of the bar and said bar being arranged to be shifted back and forth from central position successively in both directions thereby to align the centers on the shelves.

42. A machine provided with mechanism according to claim 41 in which said sliding bar is mounted to slide in bearings in side frame members of the machine and is equipped with a pair of shifter arms provided with cam members, and in which the machine includes a rotary cam formed with side faces arranged to cooperate with said cam members on the shifter arms.

ROY D. KING.
HERBERT J. MELVILLE.
WILLIAM SWIFT LORD.